United States Patent [19]
Miyake et al.

[11] Patent Number: 6,047,371
[45] Date of Patent: Apr. 4, 2000

[54] SIGNAL PROCESSOR FOR PERFORMING CONDITIONAL OPERATION

[75] Inventors: Jiro Miyake, Osaka; Miki Urano, Wakayama; Genichiro Inoue, Osaka, all of Japan

[73] Assignee: Matsushita Electric Industrial Co., Ltd., Osaka, Japan

[21] Appl. No.: 08/907,953

[22] Filed: Aug. 11, 1997

[30] Foreign Application Priority Data

Aug. 23, 1996 [JP] Japan .................................... 8-222119

[51] Int. Cl.⁷ ...................................................... G06F 9/00
[52] U.S. Cl. ............................ 712/220; 712/1; 712/200; 712/208; 712/211; 712/212; 712/234; 712/236
[58] Field of Search ......................... 395/800.32, 800.43, 395/800.42, 377, 379, 384, 500.24, 564, 567; 712/1, 23, 200, 208, 211, 212, 220, 234, 236, 232

[56] References Cited

U.S. PATENT DOCUMENTS

| | | | |
|---|---|---|---|
| 4,992,934 | 2/1991 | Portanova et al. ....................... | 712/209 |
| 5,014,196 | 5/1991 | Hayashi et al. .............................. | 712/7 |
| 5,404,557 | 4/1995 | Yamashita .................................. | 712/23 |
| 5,430,852 | 7/1995 | Watanabe et al. ....................... | 712/233 |
| 5,522,084 | 5/1996 | Ando ........................................ | 712/23 |
| 5,581,717 | 12/1996 | Boggs et al. ............................. | 712/208 |
| 5,606,677 | 2/1997 | Balmer et al. ........................... | 395/384 |
| 5,696,959 | 12/1997 | Guttag et al. ............................ | 395/595 |
| 5,710,914 | 1/1998 | Verbauwhede et al. ................. | 712/245 |
| 5,761,470 | 6/1998 | Yoshida ................................... | 712/210 |

FOREIGN PATENT DOCUMENTS 0483861  5/1992  European Pat. Off. .
2693571  1/1994  France .

OTHER PUBLICATIONS

Patent Abstracts of Japan, vol.008,No.286 (P–324), Dec. 27, 1984 & JP 59 148948A (Nippon Denki KK), Aug. 25, 1984.
Patent Abstracts of Japan, vol.006,No.112(P–124), Jun. 23, 1982 & JP 57 041741A (NEC Corp) Mar. 9, 1982.
"Renaming of an Instruction register field for speed improvement"IBM Technical Disclosure Bulletin, vol. 37, No.4B, Apr. 1, 1994, p. 589/590 XP000451363.
"Logic Circuit to Enhance the Function of an Arithmetic Logic Unit"IBM Technical Disclosure Bulletin, vol.31, No.9, Feb. 1989, p. 454 XP000046869 EPO Search Report dated Nov. 11, 1998.

*Primary Examiner*—Daniel H. Pan
*Assistant Examiner*—Dzung C. Nguyen
*Attorney, Agent, or Firm*—Stevens, Davis, Miller & Mosher, L.L.P.

[57] ABSTRACT

To provide a signal processor for performing processing in fewer cycles by selecting one of the two different operations in accordance with a flag signal and performing the selected operation without the use of a conditional branch instruction, the signal processor is provided with an instruction decoder, a control selecting circuit, a selecting circuit and an arithmetic unit. The instruction decoder decodes an instruction to output two control signals. The control selecting circuit is connected to the instruction decoder and selects one of the control signals in accordance with a flag signal stored in a flag holding circuit to output the selected signal. The selecting circuit selects one of a plurality of input data in accordance with the control signal outputted by the control selecting circuit and outputs the selected data. The arithmetic unit performs an operation on the data outputted by the selecting circuit.

26 Claims, 5 Drawing Sheets

Fig. 4

UNCONDITIONAL OPERATION INSTRUCTION type=0

| type | add | pi | qi | ri | sel1 | sel2 | cnt | type=1

| type | add | pi | qi | ri | sel1 | imm | cnt |

CONDITIONAL OPERATION INSTRUCTION type=2

| type | add0 | add1 | pi | qi | ri0 | ri1 | sel1 | sel2 | cnt | type=3

| type | add0 | add1 | pi | qi | ri0 | ri1 | sel1 | imm | cnt |

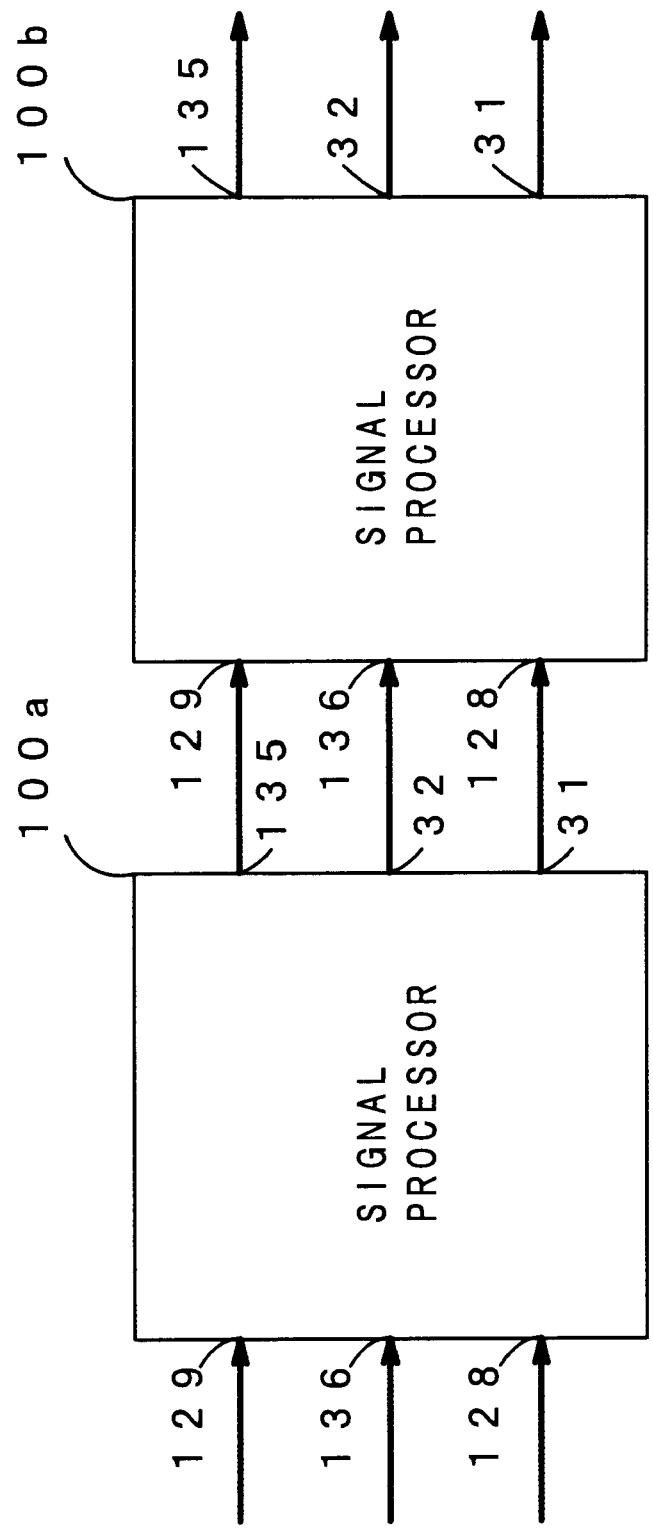

SIGNAL PROCESSOR FOR PERFORMING CONDITIONAL OPERATION

BACKGROUND OF THE INVENTION

1. Field of the Invention

The present invention relates to a signal processor for performing data processing in compliance with instructions, more particularly, to a signal processor capable of performing different processings in accordance with the value of a flag.

2. Description of the Prior Art

A signal processor for performing data processing in compliance with instructions is widely used for various apparatuses since it is capable of realizing various processings and functions by means of a program, which is a sequence of instructions.

The signal processor comprises an instruction decoder, an arithmetic unit and a data holding circuit. The instruction decoder decodes an instruction to generate a control signal and based on the control signal, data is read out from the data holding circuit. The arithmetic unit performs an operation designated by the control signal on the data being read out and the result of the operation is stored in the data holding circuit in accordance with the control signal. By performing such processing in compliance with instructions, various functions are realized.

A case will be considered where the following processing is performed by using the signal processor:

```
(Processing 1)
if (A≧B) then C=A;
    else C=B;
```

In Processing 1, data A and data B are compared and when the data A is greater, the data A is substituted as data C, otherwise the data B is substituted as the data C. That is, a different processing is performed according to the condition.

When this processing is performed with instructions, an instruction called a conditional branch instruction is used.

The conditional branch instruction is an instruction which causes the program to branch only when the value of a flag representative of the result of the previous operation is a specific value.

Processing 1 may be realized by the following combination of instructions (program):

```
        cmp r1, r2
        bge L1
        nop
        mov r3, r2
        ba L2
        nop
L1:
        mov r3, r1
L2:
```

In this program, reference designations r1, r2 and r3 represent registers for storing data used for the operation and the data A, B and C are stored in the registers r1, r2 and r3, respectively.

In this program, first, in compliance with a compare instruction cmp, the data B in the register r2 is subtracted from the data A in the register r1 and the result of the subtraction is set in a flag. When the subtraction result set in the flag is a positive value or 0, i.e. when the data A in the register r1 is equal to or greater than the data B in the register r2, a conditional branch instruction bge causes the program to branch to a label L1, otherwise the program does not branch but the succeeding instruction is executed. When the program branches to the label L1, the data A in the register r1 is stored in a register r3 as the data C in compliance with a move instruction mov. When the program does not branch, the data B in the register r2 is stored in the register r3 as the data C in compliance with the move instruction mov. Then, an unconditional branch instruction ba causes the program to unconditionally branch to a label L2. Processing 1 is thus realized.

In this signal processor, however, when the processing is changed by using a conditional branch instruction, time is necessary for executing the conditional branch instruction and for reading from a memory an instruction designating where to branch when the process branches. This reduces the processability of the signal processor.

In addition, a multiplicity of instructions are necessary such as branch instructions and instructions for each of the two different processings, so that the program size increases.

Furthermore, since the time for completing the processing varies according to the branch condition, when another apparatus uses the result of the processing, complicated control is necessary such as the adjustment of the operation timing of the apparatus.

SUMMARY OF THE INVENTION

An object of the present invention is to provide a signal processor capable of realizing a high processability by performing two different operations in accordance with a flag without the use of a branch instruction.

To solve the above-mentioned problem, a first signal processor of the present invention comprises: instruction decoding means for decoding an instruction to output a first control signal and a second control signal; control signal selecting means for selecting said first control signal or said second control signal in accordance with a flag signal and outputting the selected signal; data selecting means for selecting one of a plurality of input data in accordance with the control signal outputted by said control signal selecting means, and outputting the selected data; and arithmetic means for performing an operation with the data outputted by said data outputting means as one of its inputs.

A second signal processor of the present invention comprises: instruction decoding means for decoding an instruction to output a first control signal and a second control signal; control signal selecting means for selecting said first control signal or said second control signal in accordance with a flag signal and outputting the selected signal; a plurality of data selecting means for selecting one of a plurality of input data in accordance with the control signal outputted by said control signal selecting means, and outputting the selected data; and arithmetic means for performing an operation with the data outputted by said plurality of data outputting means as its input.

A third signal processor of the present invention comprises: instruction decoding means for decoding an instruction to output a first control signal and a second control signal; control signal selecting means, connected to said instruction decoding means, for selecting said first control signal or said second control signal in accordance with a flag signal and outputting the selected signal; and arithmetic means for performing an operation on a plurality of operation input data in accordance with the control signal outputted by said control signal selecting means.

A fourth signal processor of the present invention comprises: instruction decoding means for decoding an instruction to output a first control signal and a second control signal; control signal selecting means, connected to said instruction decoding means, for selecting said first control signal or said second control signal in accordance with a flag signal and outputting the selected signal; first data holding means for holding a plurality of data; at least one shifter, connected to said first data holding means, for shifting data stored in said first data holding means, and outputting the shifted data; at least one data selecting means, having the output of said shifter and a constant 0 as its inputs, for selecting and outputting said input data; and arithmetic means for performing an operation with the data outputted by said at least one data holding means as its input.

According to the above-described features of the present invention, an operation for each of the two conditions may be designated by one instruction and one of the two control signals is selected in accordance with the value of the flag to perform a different processing.

As described above, according to the present invention, since performing a different processing according to the condition is enabled without the use of a conditional branch instruction, the number of cycles required for the processing is reduced. Thus, the present invention is highly advantageous.

Since the number of instructions to designate the processing is reduced, the area of the program memory for storing instructions is reduced.

By making a selection between the two control signals corresponding to the conditions in accordance with the flag, the scale of the circuit for changing the processing is reduced, the processing speed is increased and various processings may be flexibly handled.

In addition, since the timing where the operation result is obtained does not vary according to the condition, it is facilitated to control the apparatus using the result.

BRIEF DESCRIPTION OF THE DRAWINGS

FIG. 4 shows the formats of the instructions in the second embodiment of the present invention; and FIG. 5 shows an arrangement in which two signal processors are connected in a third embodiment of the present invention.

DESCRIPTION OF THE PREFERRED EMBODIMENTS (First Embodiment)

Figure 1:
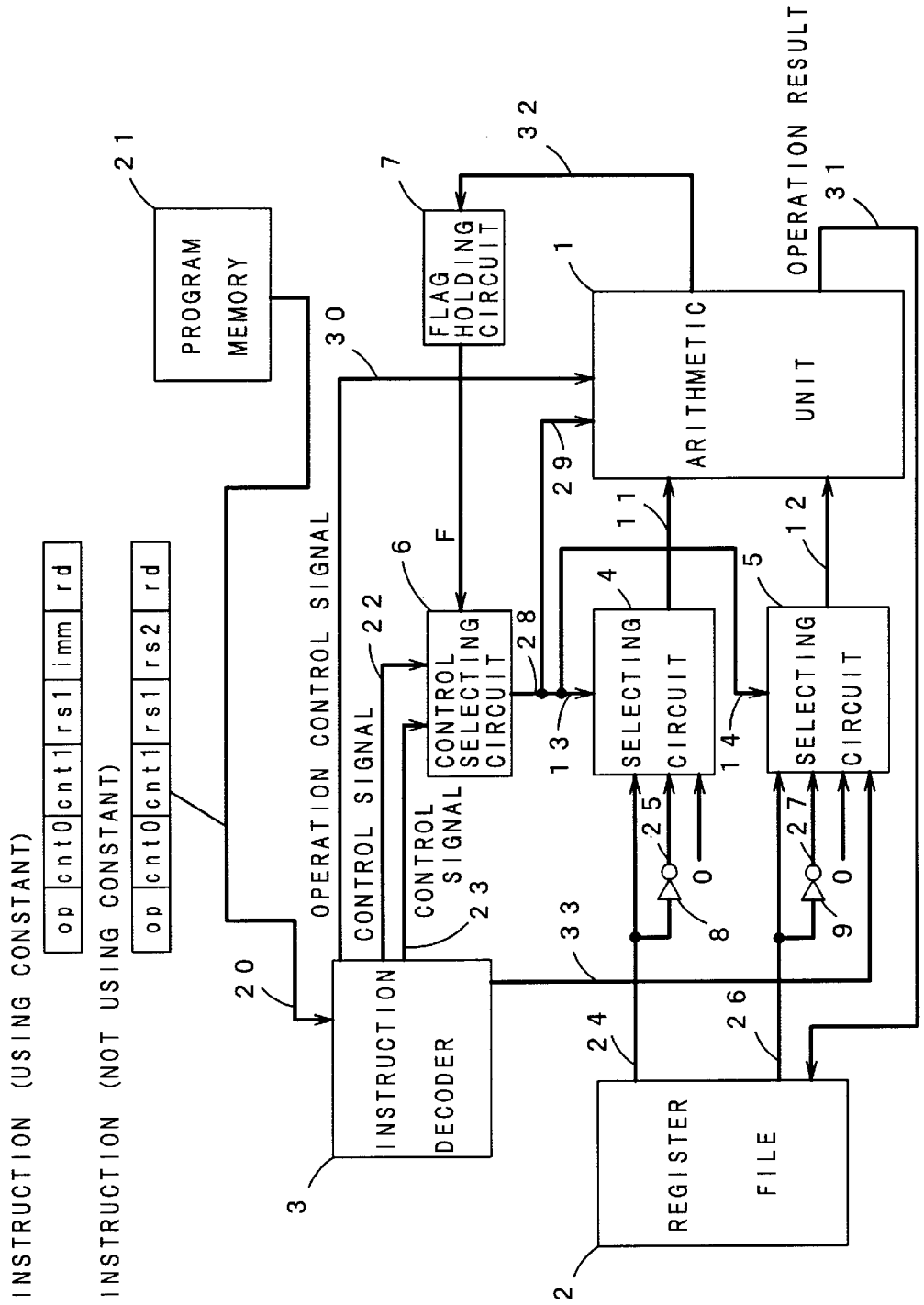
FIG. 1 is a block diagram of a signal processor in a first embodiment of the present invention.

FIG. 1 is a block diagram of a signal processor in a first embodiment of the present invention.

In FIG. 1, an instruction decoder 3 functions as the instruction decoding means for decoding an instruction 20 to output a first control signal 22 and a second control signal 23. A control selecting circuit 6 is connected to the instruction decoder 3 functioning as the instruction decoding means and functions as the control signal selecting means for selecting the first control signal 22 or the second control signal 23 in accordance with a flag signal and outputting the selected signal. Selecting circuits 4 and 5 function as the data selecting means for selecting one of a plurality of input data in accordance with a control signal 28 outputted by the control selecting circuit 6 and outputting the selected data. An arithmetic unit 1 is connected to the selecting circuits 4 and 5 and functions as the arithmetic means for performing an operation on the data outputted by the selecting circuits 4 and 5. A flag holding circuit 7 functions as the flag holding means for storing an operation result flag 32 outputted by the arithmetic unit 1, and outputting it as the flag signal. Inverting circuits 8 and 9 function as inverting means for inverting the input data and outputting the inverted data.

The arithmetic unit 1 performs an addition or a logic operation on two data supplied to inputs 11 and 12 and outputs operation result data 31 and the flag 32. The flag 32 represents a state such as whether the result is a positive value or a negative value, whether it is overflowed or not and whether it is 0 or not. Here, for simplicity, it is assumed that the flag 32 is of 1 bit and that when the result is a negative value, the flag 32 is 0 and when the result is a positive value or 0, the flag 32 is 1.

A register file 2 holds data used for the operation by the arithmetic unit 1 and data representative of the result of the operation. A program memory 21 stores instructions.

The control selecting circuit 6 having as its input the control signals 22 and 23 outputted by the instruction decoder 3 selects the control signal 22 when the value of a flag F stored in the flag holding circuit 7 is 0 and selects the control signal 23 when the value of the flag F is 1 to output the selected signal as the control signal 28. The control signal 28 is of 5 bits. The most significant two bits are supplied as a control signal 13 of the selecting circuit 4. The next two bits are supplied as a control signal 14 of the selecting circuit 5. The least significant bit is supplied as a carry input 29 of the arithmetic unit 1.

The selecting circuit 4 selects an output 24 of the register file 2 when the 2-bit control signal 13 is 00, selects an output 25 of the inverting circuit 8 when the signal 13 is 01 and selects a constant 0 when the signal 13 is 10 to output the selected data.

The selecting circuit 5 selects an output 26 of the register file 2 when the 2-bit control signal 14 is 00, selects an output 27 of the inverting circuit 9 when the signal 14 is 01, selects the constant 0 when the signal 14 is 10 and selects a constant output 33 of the instruction decoder 3 when the signal 14 is 11 to output the selected data.

The instruction 20 comprises a field op representative of the type of the operation, fields cnt0 and cnt1 representative of the control information of the operation, fields rs1 and rs2 representative of the numbers of the registers for storing data used for the operation, and a field rd representative of the number of the register for storing the result of the operation. The field cnt0 designates the control of an operation performed when the flag signal held by the flag holding circuit 7 is 0. The field cnt1 designates the control of an operation performed when the flag signal is 1. The fields cnt0 and cnt1 are of 5 bits. The most significant two bits designate the selection of the input of the selecting circuit 4. The next two bits designate the selection of the input of the selecting circuit 5. The remaining one bit is supplied as the carry input 29 of the arithmetic unit 1. When a constant is used in the operation, the constant is set in an immediate field imm.

An operation of the signal processor thus structured will be described. As an example, a case will be described where Processing 1 is realized.

Processing 1 is realized by the following combination of instructions (program):

```
cmp r1, r2
F?add r3, r1, 0:r3, 0, r2
```

In compliance with the first instruction cmp, the data B stored in the register r2 is subtracted from the data A stored in the register r1 to output the flag F. When the result of the operation is a negative value, the flag F is 0. When the result is a positive value or 0, the flag F is 1.

The second instruction is a conditional operation instruction. When the value of the flag F is 1, add r3, r1, 0 is executed. When the value of the flag F is 0, add r3, 0, r2 is executed. Add r3, r1, 0 means adding the data in the register r1 and 0 to store the result in the register r3, i.e. storing the data A as the data C. Likewise, add r3, 0, r2 means storing the data B as the data C. Since the flag F is 1 when the result of the first instruction shows A≧B and the flag F is 0 when the result shows A<B, Processing 1 is realized by executing the second instruction.

Referring now to FIG. 1, the operation of Processing 1 will be described.

First, the first instruction camp is read from the program memory 21 and supplied to the instruction decoder 3. In compliance with the instruction cmp, subtraction is performed on the two data irrespective of the value of the flag F. In the signal processor shown in FIG. 1, the subtraction is realized by bit-inverting one of the inputs, supplying 1 as the carry input 29 and performing an addition with the arithmetic unit 1. Consequently, a value representative of addition is set in the field op of the instruction cmp. In both of the fields cnt0 and cnt1, a value 00011 is set. In the field rs1, 1 is set. In the field rs2, 2 is set.

The instruction decoder 3 decodes the instruction cmp to cause the data in the registers r1 and r2 to be read from the register file 2. Moreover, the instruction decoder 3 decodes the field op to instruct the arithmetic unit 1 to perform an addition and supplies the values of the field cnt0 and the field cnt1 from the control signals 22 and 23 to the control selecting circuit 6. The control selecting circuit 6 selects the control signal 22 when the value of the flag F stored in the flag holding circuit 7 is 0 and selects the control signal 23 when the value of the flag F is 1 to output the selected signal. Since the values of the field cnt0 and the field cnt1 are the same, the same value 00011 is outputted as the control signal 28 irrespective of the value stored in the flag holding circuit 7. Since the control signal 13 is 00, the selecting circuit 4 selects the output 24 of the register file 2, i.e. the data in the register r1 and supplies it to the arithmetic unit 1 as the input 11. Since the control signal 14 is 01, the selecting circuit 5 selects the output 27 of the inverting circuit 9 and supplies it to the arithmetic unit 1 as the input 12. The output 27 of the inverting circuit 9 is the inverted data of the output 26 of the register file 2, i.e. the data in the register r2. As the carry input 29 of the arithmetic unit 1, 1 is supplied. In accordance with an operation control signal 30 from the instruction decoder 3, the arithmetic unit 1 performs an addition on the input 11, the input 12 and the carry input 29, i.e. performs a subtraction on the data in the register r1 and the register r2 to output the operation result data 31 and the flag 32. The flag 32 is stored in the flag holding circuit 7 in accordance with the control from the instruction decoder.

Then, the second instruction is read from the program memory 21 and supplied to the instruction decoder 3. In the field op of the second instruction, a value representative of addition is set. In the field cnt0, 10000 is set. In the field cnt1, 00100 is set. In the field rs1, 1 is set. In the field rs2, 2 is set. In the field rd, 3 is set. The instruction decoder 3 reads the data in the register r1 and the register r2 from the register file 2 by using the field rs1 and the field rs2 and outputs the data as the outputs 24 and 26, respectively. Moreover, the instruction decoder 3 decodes the field op to instruct the arithmetic unit 1 to perform an addition, outputs the values of the field cnt0 and the field cnt1 as the control signals 22 and 23 and supplies them to the control selecting circuit 6.

When the value of the flag F held in the flag holding circuit 7 is 1, the control selecting circuit 6 selects the value 00100 of the control signal 23 and outputs it as the control signal 28. Since the control signal 13 is 00, the selecting circuit 4 selects the output 24 of the register file 2, i.e. the data in the register r1 and outputs it as the input 11 of the arithmetic unit 1. Since the control signal 14 is 10, the selecting circuit 5 selects the constant 0 and outputs it as the input 12 of the arithmetic unit 1. As the carry input 29 of the arithmetic unit 1, 0 is supplied. In compliance with the instruction of the instruction decoder 3, the arithmetic unit 1 performs an addition on the inputs 11 and 12 and the carry input 29 and outputs the operation result 31 and the flag 32. That is, the data A in the register r1 is outputted as the operation result 31.

When the value of the flag F held in the flag holding circuit 7 is 0, the control selecting circuit 6 selects the value 10000 of the control signal 22 and outputs it as the control signal 28. Since the control signal 13 is 10, the selecting circuit 4 selects the constant 0 and outputs it as the input 11 of the arithmetic unit 1. Since the control signal 14 is 00, the selecting circuit 5 selects the output 26 of the register file 2, i.e. the data in the register r2 and outputs it as the input 12 of the arithmetic unit 1. As the carry input 29 of the arithmetic unit 1, 0 is supplied. In compliance with the instruction of the instruction decoder 3, the arithmetic unit 1 performs an addition on the inputs 11 and 12 and the carry input 29 and outputs the operation result 31 and the flag 32. That is, the data B in the register r2 is outputted as the operation result 31.

In accordance with the value of the field rd of the second instruction, the instruction decoder 3 stores the operation result data 31 in the register r3 of the register file 2 as the data C. Consequently, when the value of the flag F is 1, i.e. when A≧B, the data A is stored as the data C, and when the value of the flag F is 0, i.e. when A<B, the data B is stored as the data C. Processing 1 is thus realized.

Next, a case will be described where the following processing is performed:

```
Processing 2
if (B≧5) then C=A−B;
    else C=A+B;
```

In Processing 2, when the value of the data B is equal to or higher than 5, data (A−B) is substituted as the data C, otherwise data (A+B) is substituted as the data C. This processing may be realized by the following program:

```
cmp r2, 5
F?add r3, r1, -r2 : r3, r1, r2
```

Here, the reference designations r1, r2 and r3 represent registers for storing the data A, B and C, respectively.

In compliance with the first instruction cmp, a constant 5 is subtracted from the data B stored in the register r2 to output the flag F and the flag F is stored in the flag holding circuit 7. In compliance with the second instruction, when the value of the flag F is 1, i.e. when the value of the data B is equal to or higher than 5, the data B in the register r2 is subtracted from the data A in the register r1, and when the value of the flag F is 0, i.e. when the value of the data B is lower than 5, the data B in the register r2 is added to the data A in the register r1. In either case, the operation result data is stored in the register r3 as the data C.

The operation of Processing 2 will be described with reference to FIG. 1.

The first instruction cmp is read from the program memory 21 and supplied to the instruction decoder 3. The instruction decoder 3 subtracts the constant 5 from the value of the register r2 irrespective of the value of the flag F. The subtraction of the constant 5 is equivalent to the addition of the two's complement of the constant 5. Consequently, in the first instruction cmp, the two's complement of the constant 5 is set in the immediate field imm of the instruction and a value representative of addition is set in the field op. In both of the field cnt0 and the field cnt1, a value 00110 is set. In the field rs1, 2 is set.

The instruction decoder decodes the instruction cmp to cause the data in the register r2 to be read from the register file 2 and outputs the two's complement of the constant 5 set in the immediate field imm as the constant output 33. Moreover, the instruction decoder decodes the field op to instruct the arithmetic unit 1 to perform an addition, outputs the values of the field cnt0 and the field cnt1 as the control signals 22 and 23 and supplies them to the control selecting circuit 6. Since the values of the field cnt0 and the field cnt1 are the same, the value 00110 is outputted as the control signal 28 irrespective of the value stored in the flag holding circuit 7. Since the control signal 13 is 00, the selecting circuit 4 selects the output 24 of the register file 2, i.e. the data in the register r2 and supplies it to the arithmetic unit 1 as the input 11. Since the control signal 14 is 11, the selecting circuit 5 selects the constant output 33 of the instruction decoder 33 and supplies it to the arithmetic unit 1 as the input 12. As the carry input 29 of the arithmetic unit 1, 0 is supplied. In accordance with the operation control signal 30 from the instruction decoder 3, the arithmetic unit 1 performs an addition to the input 11, the input 12 and the carry input 29, i.e. performs the subtraction of the constant 5 from the value of the register r2, i.e. B−5 and outputs the operation result data 31 and the flag 32. The flag 32 is stored in the flag holding circuit 7 in accordance with the control from the instruction decoder 3.

Then, the second instruction is read from the program memory 21 and supplied to the instruction decoder 3. In the field op of the instruction, a value representative of addition is set. In the field cnt0, a value 00000 is set. In the field cnt1, a value 00011 is set. In the field rs1, 1 is set. In the field rs2, 2 is set. In the field rd, 3 is set. The instruction decoder 3 reads the data in the register r1 and the register r2 from the register file 2 by using the field rs1 and the field rs2 and outputs them as the outputs 24 and 26, respectively. Moreover, the instruction decoder 3 decodes the field op to instruct the arithmetic unit 1 to perform an addition, outputs the values of the field cnt0 and the field cnt1 as the control signals 22 and 23 and supplies them to the control selecting circuit 6.

When the value of the flag F held in the flag holding circuit 7 is 0, the control selecting circuit 6 selects the control signal 22 and outputs it as the control signal 28. Since the control signal 13 is 00, the selecting circuit 4 selects the output 24 of the register file 2, i.e. the data in the register r1 and outputs it as the input 11 of the arithmetic unit 1. Since the control signal 14 is 00, the selecting circuit 5 selects the output 26 of the register file 2, i.e. the data in the register r2 and outputs it as the input 12 of the arithmetic unit 1. As the carry input 29 of the arithmetic unit 1, the least significant bit of the control signal 28 of the control selecting circuit 6, i.e. 0 in this case is supplied. In compliance with the instruction of the instruction decoder 3, the arithmetic unit 1 performs an addition to the inputs 11 and 12 and the carry input 29 and outputs the arithmetic operation result 31 and the flag 32. Consequently, the result of the addition of the data A in the register r1 and the data B in the register r2 is outputted as the operation result 31.

When the value of the flag F held in the flag holding circuit 7 is 1, the control selecting circuit 6 selects the control signal 23 and outputs it as the control signal 28. Since the control signal 13 is 00, the selecting circuit 4 selects the output 24 of the register file 2 and outputs it as the input 11 of the arithmetic unit 1. Since the control signal 14 is 01, the selecting circuit 5 selects the data of the output 27 of the inverting circuit 9 and outputs it as the input 12 of the arithmetic unit 1. The output 27 of the inverting circuit 9 is the inverted data of the output 26 of the register file 2, i.e. the inverted data of the data in the register r2. As the carry input 29 of the arithmetic unit 1, 1 is supplied. In compliance with the instruction of the instruction decoder 3, the arithmetic unit 1 performs an addition on the inputs 11 and 12 and the carry input 29 and outputs the operation result 31 and the flag 32. Consequently, A−B is outputted as the operation result 31.

The instruction decoder 3 stores the operation result data 31 in the register r3 of the register file as the data C in accordance with the value of the field rd of the instruction. Consequently, when the value of the flag F is 0, the data (A+B) is stored as the data C, and when the value of the flag F is 1, the data (A−B) is stored as the data C. Processing 2 is thus realized.

As described above, by adding to the instruction information on the operation performed when the flag is 0 and information on the operation performed when the flag is 1 and providing the control selecting circuit 6 for selecting one of the two control signals 22 and 23 in accordance with the value stored in the flag holding circuit 7, it is enabled to perform a different operation according to the condition.

Since the control information field in accordance with the value of the flag is divided into two fields, the instruction decoder 3 easily generates the control signals 22 and 23, so that the scale of the circuit for generating the control signals 22 and 23 and the time required for the generation are reduced.

In addition, since the control selecting circuit 6 for changing the processing in accordance with the flag merely selects one of the two inputs in accordance with the flag, high-speed processing is realized with an extremely simple circuit.

While addition is performed in compliance with the conditional operation instruction in this example, the signal processor of the present invention may be used for a case where an operation other than addition, for example, AND and exclusive OR is performed.

While the arithmetic unit performs an operation on two input data in this embodiment, the present invention may be applied to a case where the arithmetic unit performs an operation on three or more input data.

Moreover, an arrangement may be employed such that a selecting circuit for selecting an input in accordance with the output of the control selecting circuit and outputting the selected input is coupled to only a part of a plurality of inputs of the arithmetic unit and the other inputs are supplied with data determined irrespective of the flag signal.

Figure 2:
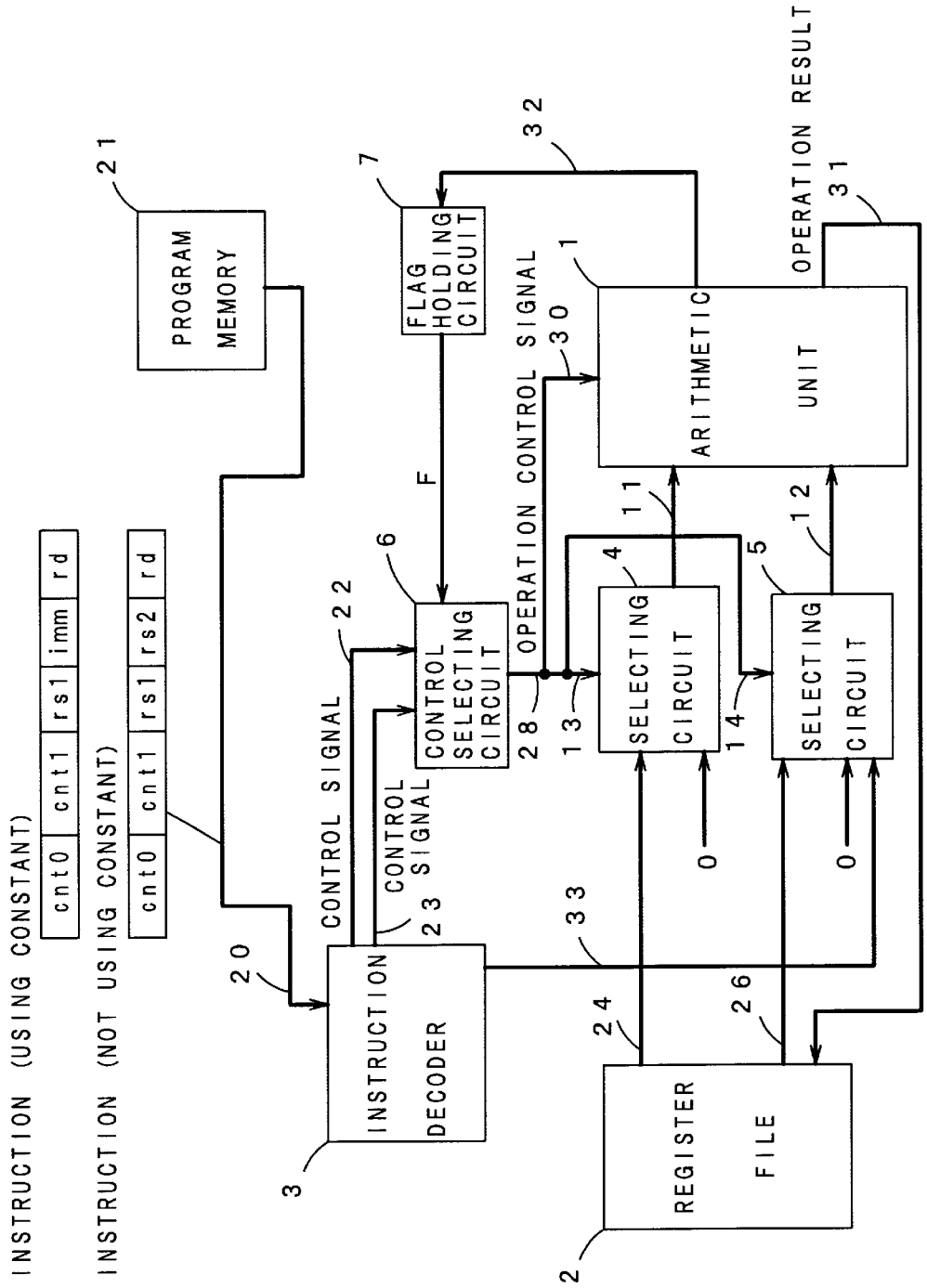
FIG. 2 is a block diagram of a signal processor in which the type of the operation is changed according to the condition in the first embodiment of the present invention.

While in this embodiment, in performing a subtraction, inverted data is inputted and 1 is supplied as the carry input to perform an addition, subtraction may be realized by providing the arithmetic unit with a subtraction function and designating the operation. In this case, information designating an addition and information designating a subtraction are set in the fields representative of the control information for the cases where the flag is 0 and where the flag is 1 so that the control selecting circuit makes a selection between the two pieces of information in accordance with the value of the flag. For example, the selection may be made in such a manner that addition is designated when the flag is 1 and subtraction is designated when the flag is 0. FIG. 2 shows a block diagram of a signal processor in which the operation performed by the arithmetic unit is changed according to the condition. In this figure, the information designating the type of the operation is included in the fields cnt0 and cnt1 and based on the information, the control signals 22 and 23 are generated by the instruction decoder 3. One of the control signals 22 and 23 is selected by the control selecting circuit 6 in accordance with the flag held in the flag holding circuit 7 and a signal representative of the type of the operation is supplied to the operation control signal 30 to control the operation of the arithmetic unit 1. Since subtraction is designated by the operation control signal 30, a conditional operation similar to that of the signal processor shown in FIG. 1 may be performed without the supply of the inverted data from the selecting circuits 4 and 5 to the arithmetic unit 1.

In the format of the instruction, the control information for the cases where the flag is 0 and where the flag is 1 may be encoded and set in one field without clearly separating the fields for the control information for the cases where the flag is 0 and where the flag is 1. For example, an arrangement may be employed such that an adder outputs a first input when the flag is 0 and the adder outputs a second input when the flag is 1, and when the field is 2, the adder adds the first input and the second input when the flag is 0 and the adder subtracts the second input from the first input when the flag is 1.

While the flag output of the arithmetic unit is stored in the flag holding circuit, the data stored in the register file or data inputted from the outside of the signal processor may be stored therein.

(Second Embodiment)

Figure 3:
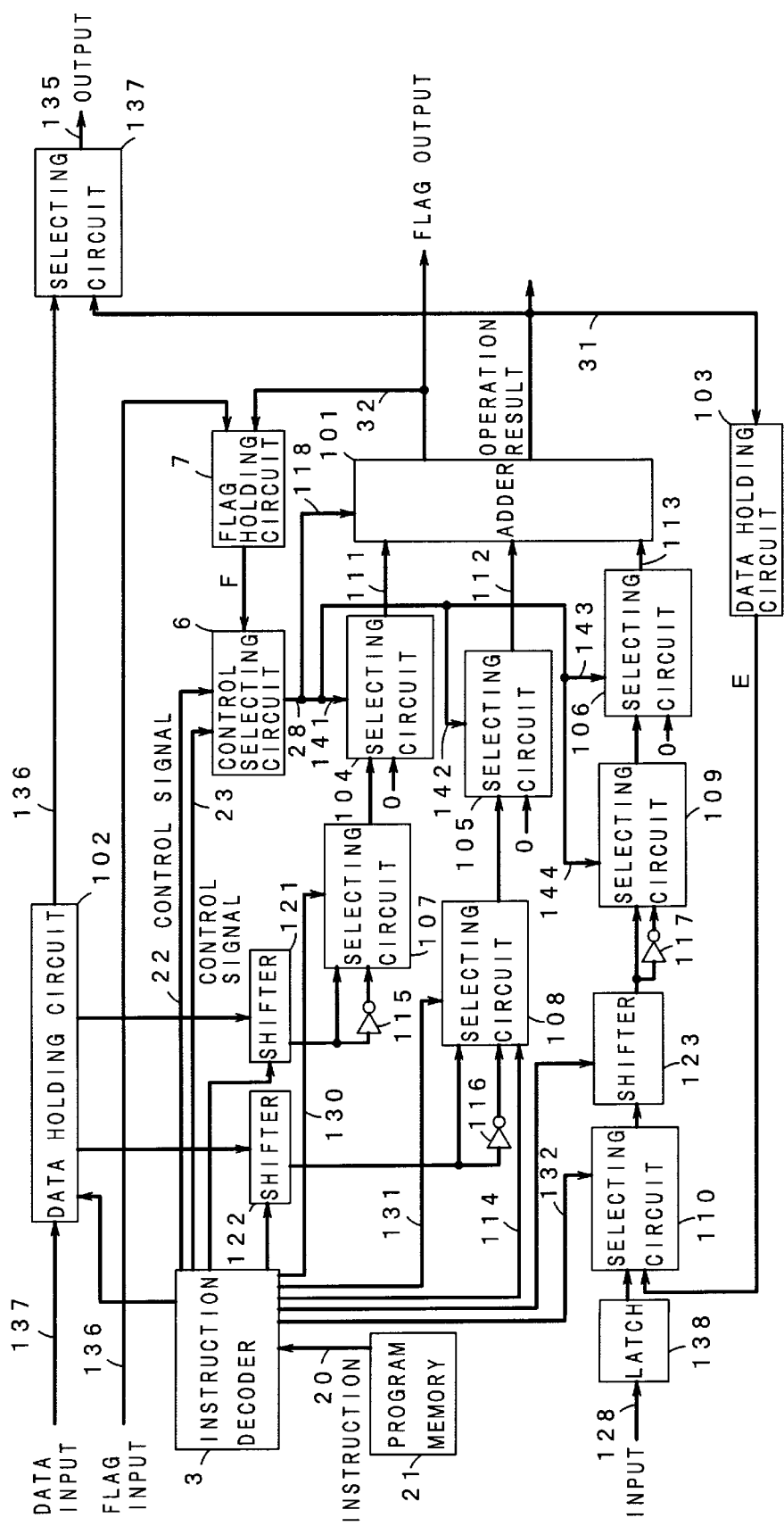
FIG. 3 is a block diagram of a signal processor in a second embodiment of the present invention.

FIG. 3 is a block diagram of a signal processor showing a second embodiment of the present invention. In FIG. 3, elements having the same functions as those of FIG. 1 are denoted by the same reference designations and will not be described in detail. Selecting circuits 104, 105 and 106 function as the data selecting means for selecting one of a plurality of input data in accordance with the control signal 28 outputted by the control selecting circuit 6, and outputting the selected data. An adder 101 is connected to the selecting circuits 104, 105 and 106 and functions as the arithmetic means for performing an operation on data outputted by the selecting circuits 104, 105 and 106. A data holding circuit 102 functions as the first data holding means for holding a plurality of data. A data holding circuit 103 functions as a second data holding means for storing the operation result 31 outputted by the adder 101, and outputting the stored data. Inverting circuits 115, 116 and 117 function as the inverting means for inverting input data and outputting the inverted data.

The adder 101 adds the values of three inputs 111, 112 and 113 and a carry input 118 to output the operation result 31 and the flag 32. A selecting circuit 137 selects the operation result 31 of the adder 101 or an output 136 of the data holding circuit 102 and outputs it as an output 135.

Shifters 121, 122 and 123 shift the input data by an appropriate number of bits rightward (toward lower order bits) or leftward (toward higher order bits) in compliance with the instruction of the instruction decoder 3. In accordance with a control signal 130 of the instruction decoder 3, a selecting circuit 107 selects the output of the shifter 121 or the output of the inverting circuit 115 and outputs the selected data. In accordance with a control signal 131 of the instruction decoder 3, a selecting circuit 108 selects one of the output of the shifter 122, the output of the inverting circuit 116 and a constant output 114 of the instruction decoder 3 and outputs the selected data. In accordance with a control signal 132 of the instruction decoder 3, a selecting circuit 110 selects the value of a data input 128 temporarily stored in a latch 138 or the output of the data holding circuit 103 and outputs the selected data to the shifter 123. A selecting circuit 109 selects the output of the shifter 123 when a control signal 144 is 0 and selects the output of the inverting circuit 117 when the control signal 144 is 1 to output the selected data. The selecting circuits 104, 105 and 106 respectively select the outputs of selecting circuits 107, 108 and 109 when corresponding control signals 141, 142 and 143 are 1 and selects the constant 0 when the corresponding control signals 141, 142 and 143 are 0 to output the selected data as the inputs 111, 112 and 113 of the adder 101.

The signal processor shown in FIG. 3 is capable of performing a product-sum operation with the shifters 121 and 122, the adder 101 and the data holding circuit 103 for accumulation. For example, when an operation $A \times (¼) + b \times (½) + C \times (¼)$ is performed on the three data A, B and C, first, the two data A and B are selected from the data holding circuit 102 and supplied to the shifters 121 and 122, respectively. The shifter 121 shifts the data A rightward (toward lower order bits) by two bits and supplies it through the selecting circuits 107 and 104 to the adder 101 as the input 111. The shifter 122 shifts the data B rightward by 1 bit and supplies it through the selecting circuits 108 and 105 to the adder 101 as the input 112. As the input 113 of the adder 101, 0 is supplied from the selecting circuit 106. As the carry input 118, 0 is also supplied. The adder 101 performs an addition on the input data and stores the operation result data 31 in the data holding circuit 103. Consequently, the result of $A \times (¼) + b \times (½)$ is obtained in the data holding circuit 103.

Then, the data holding circuit 102 selects the data C and supplies it to the shifter 121. The shifter 121 shifts the data C rightward by two bits and supplies it through the selecting circuits 107 and 104 to the adder 101 as the input 111. The data stored in the data holding circuit 103 is selected by the selecting circuit 110 and supplied to the shifter 123. Then, the data, without being shifted, is supplied through the selecting circuits 109 and 106 to the adder 101 as the input 113. As the input 112 of the adder 101, 0 is supplied from the selecting circuit 105. The adder 101 performs an addition on the supplied data and outputs the operation result 31. The operation result is the result of $A \times (\frac{1}{4}) + B \times (\frac{1}{2}) + C \times (\frac{1}{4})$.

An operation will be described in a case where by using the signal processor, different processings are performed according to the condition similarly to the signal processor of FIG. 1.

FIG. 4 shows the formats of the instructions of the signal processor shown in FIG. 3. The instructions comprise several fields. A field type which designates the type of the instruction represents an unconditional operation instruction when its value is 0 or 1 and represents a conditional operation instruction when its value is 2 or 3. When its value is 1 or 3, the field type represents an instruction using a constant for the operation. The constant used for the operation is supplied from the immediate field imm.

Fields add, add0 and add1 for controlling the three inputs of the adder represent whether data is supplied or 0 is supplied to the inputs. These fields are of three bits corresponding to the inputs of the adder, respectively. When the bit is 0, the constant 0 is supplied to the input. When the bit is 1, the data is supplied. The field add0 is information used when the flag is 0. The field add1 is information used when the flag is 1. The field add is information used irrespective of the value of the flag. Fields pi, qi, ri, ri0 and ri1 are of 1 bit and represent whether the data supplied to the three inputs of the adder is inverted or not. When the bit is 0, the data is supplied to the input of the adder without inverted. When the bit is 1, the data is supplied to the input of the adder after inverted. The field pi corresponds to the data of the input 111 of the adder 101. The field qi corresponds to the data of the input 112. The fields ri, ri0 and ri1 correspond to the data of the input 113. The field ri0 is control information used when the flag is 0. The field ri1 is control information used when the flag is 1. The fields pi, qi and ri are information used irrespective of the value of the flag.

The instruction decoder 3 outputs the values of the fields pi and qi as the control signals 130 and 131 and supplies them to the selecting circuits 107 and 108. When the instruction is an unconditional operation instruction, the instruction decoder 3 outputs as the control signals 22 and 23 a 5-bit signal which is a combination of the values of the field add, the field ri and the carry input. The carry input, which is set at 1 when subtraction is performed, is 1 when the fields pi, qi or ri is 1. When the instruction is a conditional operation instruction, the instruction decoder 3 outputs as the control signal 22 a 5-bit signal which is a combination of the values of the field add0, the field ri0 and the carry input and outputs as the control signal 23 a 5-bit signal which is a combination of the values of the field add1, the field ri1 and the carry input. The carry input value outputted as the control signal 22 is 1 when the field pi, qi or ri0 is 1. The carry input value outputted as the control signal 23 is 1 when the field pi, qi or ri1 is 1.

The five bits of the control signal 28 of the control selecting circuit 6 are supplied, one by one from the most significant bit, to the selecting circuits 104, 105, 106 and 109 as the control signals 141, 142, 143 and 144 and to the adder 101 as the carry input 118.

In addition to the fields shown here, the instruction comprises a field representative of the shift amounts of the shifters 121, 122 and 123, a field designating data read from the data holding circuit 102 and a field representative of whether the operation result 31 is stored in the data holding circuit 103 or not. However, for simplicity, these fields will not be described herein.

For example, the following processing will be described.

(Processing 3)
if (A−B≧0) then C=A−B;
    else C=−A+B;

In Processing 3, the difference between two data is found and the absolute value of the difference is obtained.

This processing is executed by using the following instructions:

First instruction: E=r1−r2
Second instruction: E=F?E: (−E)

Here, reference designations r1 and r2 represent registers in the data holding circuit 102 for holding the data A and B, and E represents data stored in the data holding circuit 103.

First, in compliance with the first instruction, an operation A−B is performed. The field add of the first instruction is 110. The fields pi, qi and ri of the first instruction are 0, 1 and 0, respectively. The carry input of the first instruction is 1. Since this instruction is an unconditional operation instruction, a value 11001 which is a combination of the values of the field add, the field ri and the carry input is outputted as the control signals 22 and 23. Since the same value is supplied as the control signals 22 and 23, the control signal 28 of the control selecting circuit 6 is the value 11001 irrespective of the value stored in the flag holding circuit 7. By the control by the instruction decoder 3, the data A in the register r1 and the data B in the register r2 are read from the data holding circuit 102 and supplied to the shifters 121 and 122, respectively. The shifters 121 and 122 output the input data without shifting them. Since the control signal 141 is 1, the selecting circuit 104 selects the output of the selecting circuit 107 and outputs it as the input 111 of the adder 101. Since the control signal 142 is 1, the selecting circuit 105 selects the output of the selecting circuit 108 and outputs it as the input 112 of the adder 101. Since the control signal 143 is 0, the selecting circuit 106 selects the constant 0 and outputs it as the input 113 of the adder 101. To the control signals 130 and 131, the values of the fields pi and qi of the instruction, i.e. 0 and 1 are supplied. The selecting circuit 107 selects and outputs the output of the shifter 121. The selecting circuit 108 selects and outputs the output of the inverting circuit 116. Consequently, to the inputs 111, 112 and 113 of the adder 101, the data A, the inverted data of the data B and the constant 0 are supplied, respectively. To the carry input 118, 1 is supplied. The data 31 and the flag 32 representative of the result of the addition by the adder 101 represent the result of A−B. The operation result data 31 is stored in the data holding circuit 103 and the flag 32 is stored in the flag holding circuit 7.

Then, the second instruction is executed. The second instruction is a conditional operation instruction. The field add0 and the field add1 are both 001. The fields pi and qi are 0 and 0, respectively. The fields ri0 and ri1 are 1 and 0, respectively. Consequently, the instruction decoder 3 outputs a value 00111 as the control signal 22 and outputs a value 00100 as the control signal 23.

When the value of the flag F stored in the flag holding circuit 7 is 0, the control selecting circuit 6 selects the control signal 22 and outputs the value 00111 as the control signal 28. Since the control signals 141 and 142 are both 0, the selecting circuits 104 and 105 select the constant 0 and output it as the inputs 111 and 112 of the adder 101. Since the control signal 143 is 1, the selecting circuit 106 selects the output of the selecting circuit 109 and outputs it as the input 113 of the adder 101. The selecting circuit 110 outputs the output of the data holding circuit 103, i.e. the operation result A−B of the first instruction. Since the control signal 144 is 1, the selecting circuit 109 selects and outputs the output of the inverting circuit 117. Consequently, the inverted data of the data A−B is supplied through the selecting circuit 106 to the adder 101 as the input 113. Since 1 is supplied to the carry input 118, the adder 101 performs an operation 0+0−(A−B) and outputs −A+B to the operation result 31.

When the value of the flag F stored in the flag holding circuit 7 is 1, the control selecting circuit 6 selects the control signal 23 and outputs a value 00100 as the control signal 28. As the inputs 111 and 112 of the adder 101, the constant 0 is supplied similarly to the case where the value of the flag F is 0. Since the control signal 143 is 1, the selecting circuit 106 selects the output of the selecting circuit 109 and outputs it as the input 113 of the adder 101. Since the control signal 144 is 0, the selecting circuit 109 selects and outputs the output of the shifter 123. The selecting circuit 110 selects and outputs the value of the output A−B of the data holding circuit 103 by the control by the instruction decoder 3. Consequently, the constant 0, the constant 0 and the data A−B are inputted to the adder 101 as the inputs 111, 112 and 113. Since 0 is supplied as the carry input 118, the adder 101 outputs A−B to the operation result 31.

Thus, when the value of the flag F is 1, i.e. when A−B is a positive value or 0, A−B is outputted and stored in the data holding circuit 103, and when the value of the flag F is 0, i.e. when A−B is a negative value, −A+B is outputted and stored in the data holding circuit 103. Processing 3 is thus realized.

Next, an operation will be described in a case where the data B is a constant in Processing 1.

This processing is realized by the combination of the following instructions:

First instruction: E=r1−B
Second instruction: E=F?B:r1

Here, reference designation r1 represents a register in the data holding circuit 102 for holding the data A, and E represents data stored in the data holding circuit 103. B is a constant.

In compliance with the first instruction, the constant B is subtracted from the data A in the register r1 and the flag representative of the result is stored.

The first instruction is an unconditional operation instruction. Since the constant B is used, the field type is 1. The constant B is supplied from the immediate field imm. In this case, the two's complement of the constant B is set in the immediate field imm. The field add is 110. The fields pi, qi and ri are 0, 0 and 0, respectively. The instruction decoder 3 decodes the first instruction and outputs 11000 as the control signals 22 and 23. The control selecting circuit 6 outputs 11000 as the control signal 28 irrespective of the value of the flag holding circuit 7. Since 1 is supplied to the control signal 141, the selecting circuit 104 selects and outputs the output of the selecting circuit 107. Since 1 is supplied to the control signal 142, the selecting circuit 105 selects and outputs the output of the selecting circuit 108. Since 0 is supplied to the control signal 143, the selecting circuit 106 selects and outputs the constant 0. Since 0 is supplied to the control signal 144, the selecting circuit 109 selects and outputs the output of the shifter 123. The instruction decoder 3 outputs as the constant output 114 the two's complement of the constant B set in the immediate field imm of the instruction. In compliance with the control by the instruction decoder 3, the selecting circuit 107 selects and outputs the output of the shifter 121 and the selecting circuit 108 selects and outputs the constant output 114. Consequently, since the data A in the register r1, the two's complement of the constant B and the constant 0 are supplied as the inputs 111, 112 and 113 of the adder 101, respectively, and 0 is supplied as the carry input 118, the data representative of the result of A−B is outputted to the operation result 31 and its flag is outputted as the flag 32. The value of the flag 32 is stored in the flag holding circuit 7 in compliance with the control by the instruction decoder 3.

The second instruction is a conditional operation instruction to perform different operations according to the value of the flag F. Since the constant B is used, the field type is 3. When the value of the flag F is 1, the constant B is stored in the data holding circuit 103. When the value of the flag F is 0, the data A in the register r1 is stored in the data holding circuit 103.

The fields add0 and add1 of the second instruction are 100 and 010, respectively. The fields pi and qi of the second instruction are 0 and 0, respectively. The fields ri0 and ri1 of the second instruction are 0 and 0, respectively. In the immediate field imm of the second instruction, the constant B is set.

By the control by the instruction decoder 3, the data A is read from the data holding circuit 102 and supplied to the shifter 121. In this case, since the shift amount is 0, the shifter 121 outputs the data A to the selecting circuit 107 without shifting it. As the constant output 114, the constant B set in the immediate field imm is outputted. The selecting circuit 108 selects and outputs the value of the constant output 114, i.e. the constant B. The instruction decoder 3 decodes the second instruction and outputs a value 10000 and a value 01000 to the control signal 22 and the control signal 23, respectively.

When the value of the flag F stored in the flag holding circuit 7 is 0, the control selecting circuit 6 outputs the value 10000 of the control signal 22 as the control signal 28. Since 1 is supplied to the control signal 141, the selecting circuit 104 selects the output of the selecting circuit 107. Since 0 is supplied to the control signals 142 and 143, the selecting circuits 105 and 106 select the constant 0. The selecting circuit 107 selects and outputs the output of the shifter 121 by the control by the instruction decoder 3. Consequently, since the data A, the constant 0 and the constant 0 are supplied as the inputs 111, 112 and 113 of the adder 101, respectively, and 0 is supplied as the carry input 118, the adder 101 outputs A+0+0, i.e. A to the operation result 31. The data A outputted to the operation result 31 is stored in the data holding circuit 103.

When the value of the flag F is 1, the control selecting circuit 6 outputs the value 01000 of the control signal 23 as the control signal 28. Since the control signals 141 and 143 are 0, the selecting circuits 104 and 106 select and output the constant 0. Since the control signal 142 is 1, the selecting circuit 105 selects and outputs the output of the selecting circuit 108, i.e. the constant B. Consequently, since the constant 0, the constant B and the constant 0 are supplied as the inputs 111, 112 and 113 of the adder 101, respectively, and 0 is supplied as the carry input 118, the adder 101 outputs 0+B+0, i.e. B as the operation result 31. The data B outputted as the operation result 31 is stored in the data holding circuit 103.

Thus, the operation is performed for the case where B is a constant in Processing 1.

Since the control selecting circuit 6 merely selects the control signal 22 or the control signal 23 according to the flag stored in the flag holding circuit 7, the circuit structure is simple and the delay time is reduced.

The flag holding circuit may hold a plurality of flags so that the control selecting circuit 6 selects the control signal 22 or the control signal 23 by using one of the flags.

While the flag output of the adder 101 is a signal representative of whether the operation result is a negative value or not in this embodiment, the output may be one or a plurality of signals representative of a state such as whether the operation result is overflowed or not, whether the result is 0 or not, or whether carrying from the most significant bit takes place or not. The control selecting circuit 6 may select the control signal 22 or the control signal 23 according to a combination of a plurality of flags stored in the flag holding circuit 7.

While in this embodiment, when subtraction is performed on one of the three inputs of the adder, the data is inverted and supplied to the carry input to perform an addition, the number of bits of the carry input may be two or more so that subtraction may be performed on two or more data.

The present invention may be applied to cases where the adder performs an operation on two input data or four or more input data.

Moreover, an arrangement may be employed such that some of the shifters or the selecting circuits in this embodiment are omitted and only a part of the inputs of the adder is provided with the function to cause the data to be changed according to the flag.

As described above, by adding to the instruction information on the operation performed when the flag is 0 and information on the operation performed when the flag is 1 and providing the control selecting circuit 6 which selects either of the two control signals in accordance with the value stored in the flag holding circuit 7, it is enabled to perform a different operation according to the condition.

(Third Embodiment)

FIG. 5 shows a third embodiment of the present invention and illustrates an arrangement in which two signal processors are connected.

In FIG. 5, reference designations 100a and 100b each represent the signal processor in FIG. 3. Outputs 135, 32 and 31 of the signal processor 100a are supplied to the signal processor 100b as the inputs 129, 136 and 128.

The use of the two signal processors 100a and 100b connected in series enables a conditional operation instruction to be executed by the succeeding signal processor 100b by using the flag representative of the result of the operation performed by the preceding signal processor 100a.

For example, a case will be described where division is performed by using the two signal processors 100a and 100b.

The operation of each cycle in performing a division A÷B is shown in the following:

| (Signal processor 100a) | (Signal processor 100b) |
|---|---|
| Cycle 1 E=A−B | |
| Cycle 2 E=F?E×2−B:E×2+B | E=PF?1:0 |
| Cycle 3 E=F?E×2−B:E×2+B | E=PF?E×2+1:E×2+0 |
| Cycle 4 E=F?E×2−B:E×2+B | E=PF?E×2+1:E×2+0 |
| Cycle 5 | E=PF?E×2+1:E×2+0 |

Here, PF represents the flag representative of the result of the operation performed at the preceding signal processor 100a.

In this processing, it is assumed that the dividend A is supplied as the data input 128 of the signal processor 100a and held by the data holding circuit 102 and that the divisor B is supplied as the data input 129 of the signal processor 100a and held by the data holding circuit 102.

In the signal processor 100a, in the cycle 1, the data A is supplied as the data input 128 and then supplied through the latch 138, the selecting circuit 110, the shifter 123 and the selecting circuits 109 and 106 to the adder 101 as the input 113. The data B is read from the data holding circuit 102 and supplied from the shifter 121 to the inverting circuit 115. After being inverted, the data B is supplied through the selecting circuits 107 and 104 to the adder 101 as the input 111. As the input 112, the constant 0 is supplied from the selecting circuit 105. As the carry input 118, 1 is supplied. An addition is performed by the adder 101 and the result data A−B is outputted to the operation result 31 and stored in the data holding circuit 103. Simultaneously, the operation result flag 32 is stored in the flag holding circuit 7.

In the cycle 2, when the value of the flag F stored in the flag holding circuit 7 is 1, the data E stored in the data holding circuit 103 is doubled, i.e. shifted by one bit leftward and the data B is subtracted. When the value of the flag F is 0, the data B is added to the data E being doubled. At this time, the data B is read from the data holding circuit 102 and supplied to the two shifters 121 and 122. The selecting circuit 107 selects and outputs the output of the shifter 121. The selecting circuit 108 selects and outputs the output of the inverting circuit 116 which is the inverted data of the output of the shifter 122. When the value of the flag F is 0, the selecting circuit 104 supplies the data B to the adder 101 as the input 111. The selecting circuit 105 supplies the constant 0 to the adder as the input 112. When the value of the flag F is 1, the selecting circuit 104 supplies the constant 0 to the adder 101 as the input 111. The selecting circuit 105 supplies the data B being inverted to the adder 101 as the input 112. As the carry input 118, is supplied when the value of the flag F is 1 and 0 is supplied when the value of the flag F is 0. As the input 113, the data E being doubled is supplied irrespective of the value of the flag F.

The operation result data is stored in the data holding circuit 103 and the operation result flag is stored in the flag holding circuit 7. In the cycle 3 and in the cycle 4, the same operation as that of the cycle 2 is repeated. The instructions of the cycles 2, 3 and 4 are conditional operation instructions. The field add1 of the instructions is 101, the field add0 is 011, the fields pi and qi are 0 and 1, respectively, and the fields ri0 and ri1 are both 0. The instruction decoder 3 outputs 01101 and 10100 to the control signals 22 and 23, respectively.

The flags representative of the results of the operations performed in the cycles 1, 2, 3 and 4 are the bits of the quotient of the division A÷B, respectively. By using the 1-bit flags, a 4-bit quotient is formed at the succeeding signal processor 100b. The flag 32 obtained by the operation in the cycle 1 of the signal processor 100a is inputted to the flag input 136 of the signal processor 100b, captured by the flag holding circuit 7 in the cycle 2 and used for the selection between the control signals 22 and 23 by the control selecting circuit 6. In the description of the instruction of the signal processor 100b, PF represents the flag of the preceding signal processor. In the signal processor 100b, in the cycle 2, when the flag representative of the result of the operation performed in the cycle 1 of the preceding signal processor 100a is 1, 1 is stored in the data holding circuit 103. When the flag is 0, 0 is stored in the data holding circuit 103. This instruction is also a conditional operation instruction. The field add1 is 010. The field add0 is 000. The fields pi, qi, ri0 and ri1 are all 0. To the control signals 22 and 23, 01000 and 00000 are outputted, respectively. When the value of the flag F is 1, the value 1 outputted as the constant output 114 is supplied to the adder 101 as the input 113 and 1 is outputted as the operation result 31. When the value of the flag F is 0, since 0 is supplied to the adder 101 as all of the inputs 111, 112 and 113, 0 is outputted as the operation result 31. The operation result 31 is stored in the data holding circuit 103.

In the cycles 3, 4 and 5, the operations are similarly performed. In this case, a value is added which is obtained by shifting the data E stored in the data holding circuit 103 by 1 bit leftward.

Consequently, by using the flag obtained through the four operations at the signal processor 100a, a 4-bit quotient is obtained at the succeeding signal processor 100b. For example, when the data A is 4 and the data B is 3, 1010 is obtained in the data holding circuit 103 of the signal processor 100b. The most significant bit of the 4-bit data is the first digit of an integer and the other bits constitute the fractional portion.

Thus, connecting the signal processors enables a conditional operation instruction to be performed by using a flag outputted by another signal processor.

In addition, since no conditional branch instruction is used, the timing where the operation result is obtained does not vary according to the condition, so that it is facilitated to control the signal processor for performing processing by using the operation result.

What is claimed is:

1. A signal processor comprising:
   instruction decoding means for decoding an instruction to output a first control signal for data selection and a second control signal for data selection;
   control signal selecting means for selecting said first control signal or said second control signal in accordance with a flag signal and outputting the selected signal;
   data selecting means for selecting one of a plurality of input data in accordance with the one of the first control signal or the second control signal outputted by said control signal selecting means, and outputting the selected data; and
   arithmetic means for performing an operation with the data outputted by said data outputting means as one of its inputs.

2. A signal processor comprising:
   instruction decoding means for decoding an instruction to output a first control signal for data selection and a second control signal for data selection;
   control signal selecting means for selecting said first control signal or said second control signal in accordance with a flag signal and outputting the selected signal;
   a plurality of data selecting means for selecting one of a plurality of input data in accordance with the one of the first control signal or the second control signal outputted by said control signal selecting means, and outputting the selected data; and
   arithmetic means for performing an operation with the data outputted by said plurality of data outputting means as its input.

3. A signal processor according to claim 1, wherein a constant 0 is inputted to one of the plurality of input data of said data selecting means.

4. A signal processor according to claim 1, further comprising at least one inverting means for inverting input data and outputting the inverted data,
   wherein the output of said inverting means is coupled to one of the plurality of inputs of said data selecting means,
   wherein said first and second control signals include carry input information of said arithmetic means, and
   wherein said arithmetic means performs the operation by using the carry input information included in the output of said control signal selecting means.

5. A signal processor according to claim 1, further comprising flag holding means for storing an operation result flag of said arithmetic means and outputting the operation result flag to said control signal selecting means as said flag signal.

6. A signal processor according to claim 5, wherein said operation result flag of the arithmetic means is representative of whether a result of the operation performed by said arithmetic means is a negative value or not.

7. A signal processor according to claim 5, wherein said flag holding means stores a plurality of operation result flags, selects one of said plurality of operation result flags and outputs the selected flag to said control signal selecting means as said flag signal.

8. A signal processor according to claim 1, further comprising flag holding means, having as its inputs said operation result flag of the arithmetic means and an input flag, for selecting and storing said operation result flag and said input flag and outputting the flags to said control signal selecting means as said flag signal.

9. A signal processor according to claim 1, wherein said instruction includes a first control field and a second control field representative of control of operations for two conditions represented by said flag signal, and
   wherein said instruction decoding means generates said first and second control signals by using said first and second control fields of the instruction.

10. A signal processor comprising:
    instruction decoding means for decoding an instruction to output a first control signal for operation instruction and a second control signal for operation instruction;
    control signal selecting means, connected to said instruction decoding means, for selecting said first control signal or said second control signal in accordance with a flag signal and outputting the selected signal; and
    arithmetic means for performing an operation on a plurality of operation input data in accordance with the one of the first control signal or the second control signal outputted by said control signal selecting means.

11. A signal processor according to claim 10, further comprising at least one data selecting means for selecting one of the plurality of input data in accordance with the control signal outputted by said control signal selecting means, and outputting the selected data, wherein the output of said at least one data selecting means is supplied to the operation input data of said arithmetic means.

12. A signal processor according to claim 10, wherein said instruction includes a first control field and a second control field representative of control of operations for two conditions represented by said flag signal, and wherein said instruction decoding means generates said first and second control signals by using said first and second control fields of the instruction.

13. A signal processor comprising:

instruction decoding means for decoding an instruction to output a first control signal for data selection and a second control signal for data selection;

control signal selecting means, connected to said instruction decoding means, for selecting said first control signal or said second control signal in accordance with a flag signal and outputting the selected signal;

first data holding means for holding a plurality of data;

at least one shifter, connected to said first data holding means, for shifting data stored in said first data holding means and outputting the shifted data;

at least one data selecting means, having the output of said shifter and a constant 0 as its inputs, for selecting and outputting said input data; and arithmetic means for performing an operation with the data outputted by said at least one data holding means as its input.

14. A signal processor according to claim 13, further comprising second data holding means for storing operation result data outputted by said arithmetic means and outputting the stored data, wherein an output of said second data holding means is supplied to one of the inputs of the arithmetic means directly or through one of said at least one data selecting means.

15. A signal processor according to claim 14, wherein said second data holding means shifts data and outputs the shifted data.

16. A signal processor according to claim 13, further comprising at least one inverting means for inverting input data and outputting the inverted data, wherein the output of said inverting means is coupled to one of the plurality of inputs of said data selecting means, wherein said first and second control signals include carry input information of said arithmetic means, and wherein said arithmetic means performs the operation by using the carry input information included in the output of said control signal selecting means.

17. A signal processor according to claim 13, further comprising flag holding means, having as its inputs the operation result flag of said arithmetic means and an input flag, for selecting and storing said operation result flag and said input flag and outputting the flags to said control selecting means as said flag signal.

18. A signal processor with the signal processor according to claim 8 as a signal processing element, comprising a first signal processing element and a second signal processing element, wherein an operation result flag of arithmetic means of said first signal processing element is supplied to an input flag of said second signal processing element.

19. A signal processor according to claim 2, wherein a constant 0 is inputted to one of the plurality of input data of said data selecting means.

20. A signal processor according to claim 2, further comprising at least one inverting means for inverting input data and outputting the inverted data, wherein the output of said inverting means is coupled to one of the plurality of inputs of said data selecting means, wherein said first and second control signals include carry input information of said arithmetic means, and wherein said arithmetic means performs the operation by using the carry input information included in the output of said control signal selecting means.

21. A signal processor according to claim 2, further comprising flag holding means for storing an operation result flag of said arithmetic means and outputting the operation result flag to said control signal selecting means as said flag signal.

22. A signal processor according to claim 21, wherein said operation result flag of the arithmetic means is representative of whether a result of the operation performed by said arithmetic means is a negative value or not.

23. A signal processor according to claim 21, wherein said flag holding means stores a plurality of operation result flags, selects one of said plurality of operation result flags and outputs the selected flag to said control signal selecting means as said flag signal.

24. A signal processor according to claim 2, further comprising flag holding means, having as its inputs said operation result flag of the arithmetic means and an input flag, for selecting and storing said operation result flag and said input flag and outputting the flags to said control signal selecting means as said flag signal.

25. A signal processor according to claim 2, wherein said instruction includes a first control field and a second control field representative of control of operations for two conditions represented by said flag signal, and wherein said instruction decoding means generates said first and second control signals by using said first and second control fields of the instruction.

26. A signal processor with the signal processor according to claim 17 as a signal processing element, comprising a first signal processing element and a second signal processing element, wherein an operation result flag of arithmetic means of said first signal processing element is supplied to an input flag of said second signal processing element.

* * * * *